(12) United States Patent
Wada et al.

(10) Patent No.: US 10,723,909 B2
(45) Date of Patent: Jul. 28, 2020

(54) COMPOSITION AND FILM

(71) Applicant: TOYO GOSEI CO., LTD., Ichikawa-shi, Chiba (JP)

(72) Inventors: Risa Wada, Ichikawa (JP); Takeshi Osaki, Ichikawa (JP)

(73) Assignee: TOYO GOSEI CO., LTD., Ichikawa-shi (JP)

( * ) Notice: Subject to any disclaimer, the term of this patent is extended or adjusted under 35 U.S.C. 154(b) by 187 days.

(21) Appl. No.: 15/003,620

(22) Filed: Jan. 21, 2016

(65) Prior Publication Data
US 2016/0208127 A1 Jul. 21, 2016

Related U.S. Application Data

(60) Provisional application No. 62/106,142, filed on Jan. 21, 2015.

(51) Int. Cl.
| | |
|---|---|
| *C09D 133/08* | (2006.01) |
| *C09D 133/14* | (2006.01) |
| *C09D 4/00* | (2006.01) |
| C08F 220/18 | (2006.01) |
| G11B 7/26 | (2006.01) |
| C08F 222/10 | (2006.01) |

(52) U.S. Cl.
CPC ............. *C09D 133/08* (2013.01); *C09D 4/00* (2013.01); *C09D 133/14* (2013.01); *C08F 220/18* (2013.01); *C08F 222/1065* (2020.02); *G11B 7/263* (2013.01)

(58) Field of Classification Search
CPC ...... C09D 133/08; C09D 133/14; C09D 4/00; C08F 220/18; C08F 2222/1086; G11B 7/263
See application file for complete search history.

(56) References Cited

U.S. PATENT DOCUMENTS

| | | | |
|---|---|---|---|
| 2009/0008529 A1* | 1/2009 | Sugimoto | B29C 33/3857 249/127 |
| 2012/0029110 A1* | 2/2012 | Washiya | G11B 5/855 522/182 |
| 2014/0306375 A1 | 10/2014 | Wada et al. | |
| 2014/0309393 A1 | 10/2014 | Takeshi et al. | |
| 2014/0329927 A1* | 11/2014 | Ha | C09J 175/16 522/42 |
| 2014/0335304 A1 | 11/2014 | Takeshi et al. | |
| 2014/0361275 A1 | 12/2014 | Takeshi et al. | |
| 2015/0274871 A1 | 10/2015 | Takeshi et al. | |
| 2015/0368453 A1 | 12/2015 | Wada et al. | |
| 2016/0017074 A1 | 1/2016 | Wada et al. | |

FOREIGN PATENT DOCUMENTS

WO 2013150567 10/2013

* cited by examiner

Primary Examiner — Robert S Walters, Jr.
(74) Attorney, Agent, or Firm — TraskBritt

(57) ABSTRACT

Methods for producing an optical element having a cured layer with a concavo-convex structure are described. Such a method includes: forming a composition layer on a base material by using a composition containing a polymerizable compound and a photo initiator; forming a pattern formative layer by pressure-contacting a mold; and forming the cured layer having the concavo-convex structure by photo-curing the pattern formative layer, wherein the polymerizable compound contains (a) a urethane (meth)acrylate monomer, the composition contains 0.005 to 0.5 part by mass of the photo initiator with respect to 100 parts by mass of the polymerizable compound, and the cured layer has a film thickness of the concavo-convex structure within a range of 0.5 mm to 1 cm.

9 Claims, No Drawings

COMPOSITION AND FILM

CROSS-REFERENCE TO RELATED APPLICATION

This application claims the benefit of U.S. Provisional Patent Application Ser. No. 62/106,142, filed Jan. 21, 2015, the disclosure of which is hereby incorporated herein in its entirety by this reference.

TECHNICAL FIELD

An aspect of this disclosure relates to a method of producing optical elements such as optical or electronic parts, and a composition appropriately used for the method of producing the optical elements.

BACKGROUND

An imprint technique for pressing a mold with a concavo-convex pattern formed on a composition to transfer a minute pattern has been precisely used in a method of producing optical elements such as optical or electronic parts.

An imprinting method generally includes four steps: (1) applying a composition, (2) pressing the composition with a mold, (3) transferring and curing (light or heat), and (4) releasing the mold from a cured material. Simple processes allow nano-sized fabricating. In addition, equipment is simple and high throughput is expected, so that the imprinting method is expected to be a fine processing technology for mass-producing at a low cost. Thus, an effort to put the method to practical use has been advanced in the various fields such as semiconductor devices, storage media, bio and optical elements (refer to Re-publication of PCT International Publication JP 2012-2413).

BRIEF SUMMARY

A photo imprint technique of a concavo-convex structure with excellent shape accuracy is preferably used as a method of producing optical elements or devices.

In a photo imprinting method, the film thickness of a cured layer is ordinarily thinned to allow light irradiation to reach the whole composition. During polymerization, excessive heat is generated during curing, thickening the film of a composition layer. From the viewpoint of heat during polymerization, optical elements with thick film thickness having a concavo-convex structure are generally produced by injection molding or thermal imprinting of thermoplastic resin, not by photo imprinting methods. However, where thermoplastic resin is used, the use of high temperature is difficult, with heat resistance being problematic.

Thus, a method for producing optical elements of a concavo-convex structure with thick film thickness while moderately restraining heat from rising during polymerization is desired by using a photo imprinting method with excellent shape accuracy.

On the other hand, the transmittance of a cured material obtained by a photo imprinting method deteriorates from heat generated in production processes of optical elements or devices, or heat generated in operation of optical elements or devices. Thus, a method for producing optical elements in which the transmittance can also be maintained during conditions of high temperature is desired.

Conventional compositions for photo imprinting experience problems from the polymerization heat during curing and in heat resistance and transmittance of the obtained cured material.

Some aspects of this disclosure have been made in view of such circumstances, and provide a method of producing an optical element with excellent transmittance without excessively generating polymerization heat, even where the film thickness of a cured material is thick.

It has been shown in some aspects of this disclosure that a cured layer having a specific film thickness is produced by using a composition containing a specific component that is excellent in transmittance and in restraining heat from rising during polymerization.

An aspect of this disclosure is a method of producing an optical element having a cured layer with a concavo-convex structure, the method including: forming a composition layer on a base material by using a composition containing a polymerizable compound and a photo initiator; forming a pattern formative layer by pressure-contacting a mold having the concavo-convex structure on a surface of the composition layer and transferring the concavo-convex structure to the composition layer; and forming the cured layer having the concavo-convex structure by photo-curing the pattern formative layer, wherein the polymerizable compound contains a urethane (meth)acrylate monomer A, the composition contains 0.005 to 0.5 part by mass of the photo initiator with respect to 100 parts by mass of the polymerizable compound, and a film thickness of the cured layer having the concavo-convex structure is 0.5 mm to 1 cm.

Further, an aspect of this disclosure is a composition being used for the method of producing an optical element according to an embodiment of this disclosure, comprising a polymerizable compound and a photo initiator.

Some aspects of this disclosure can provide a method of producing optical elements that can restrain a rise in polymerization heat generated during curing a pattern formative layer into a cured layer, and ameliorate transmittance of the obtained cured layer.

DETAILED DESCRIPTION

Some aspects of this disclosure are hereinafter described in detail.

In a method of producing an optical element according to an aspect of this disclosure, a cured layer having a specific film thickness is obtained by using a composition containing a specific component.

In this disclosure, "(meth)acrylate" signifies "acrylate" and/or "methacrylate" corresponding thereto, and a "(meth)acryloyl group" signifies an "acryloyl group" and/or a "methacryloyl group" corresponding thereto.

Composition

A composition used for a method of producing an optical element as an aspect of this disclosure is hereinafter described.

The composition contains a polymerizable compound and a photo initiator. The content of the photo initiator is preferably within the range of 0.005 to 0.5 parts by mass with respect to 100 parts by mass of the polymerizable compound.

Polymerizable Compound

The polymerizable compound preferably contains a urethane (meth)acrylate monomer A (also referred to hereinafter as "monomer A"). The urethane (meth)acrylate monomer A is a compound having a urethane bond and a (meth)acryloyloxy group in a molecule. The urethane bond is a bond through a carbonyl group obtained by subjecting an amino group and an alcohol group to dehydration condensation.

The inclusion of monomer A has an effect on the reduction of warpage and waviness of an obtained cured layer.

In order to reduce warpage and waviness of the thus-obtained cured layer, monomer A preferably has at least one ring structure. The ring structure is preferably an alicyclic structure, a heterocyclic structure, an aromatic structure and/or a heteroaromatic structure. In the case where the ring structure has two or more rings, monomer A may have a condensation structure, or be bonded by direct coupling of alkylene groups, such as a methylene group and an ethylene group.

Examples of the alicyclic structure include a monocyclic hydrocarbon ring with a carbon number of 3 to 12, such as a cyclopropane skeleton, a cyclobutyl skeleton, a cycloheptane skeleton, cyclohexane and a tricyclodecane skeleton. These may have a substituent such as an alkyl group.

Examples of the heterocyclic structure include at least one part of methylene groups of the monocyclic hydrocarbon ring substituted with a divalent heteroatom-containing group. Specific examples include oxirane, dioxane, morpholine, piperidine isocyanuric acid, hexahydrophthalic acid, and the like.

The hydrocarbon ring and heterocyclic ring may have a bridged structure in a ring skeleton.

Examples of the aromatic structure include an aromatic ring with a carbon number of 6 to 10, such as benzene, naphthalene, indene and fluorene.

Examples of the heteroaromatic structure include pyridine, benzopyran, oxazole, imidazole, phthalimide, and the like.

With regard to transmittance, monomer A is preferably urethane (meth)acrylate having the alicyclic structure. In addition, the inclusion of urethane (meth)acrylate having the alicyclic structure tends to improve light resistance of an obtained cured layer.

Monomer A can be synthesized by an ordinary method. Specifically, for example, it can be obtained by reacting a diisocyanate and a hydroxyl group containing (meth)acrylate. Alternatively, monomer A can be obtained by synthesizing a urethane compound from a polyol and a diisocyanate to subsequently react the urethane compound and the hydroxyl group containing (meth)acrylate. Another way for synthesizing monomer A includes a method of reacting the polyol and an isocyanate group containing (meth)acrylate.

Examples of the polyol include: an aliphatic, alicyclic or aromatic polyether polyol; an aliphatic, alicyclic or aromatic polyester polyol; and the like. Among them, an aliphatic or alicyclic polyether polyol, and an aliphatic or alicyclic polyester polyol are preferable. Specifically, preferable examples thereof include ethylene glycol, propylene glycol, polyethylene glycol, polypropylene glycol, diethylene glycol, tetramethylene glycol, polytetramethylene glycol, trimethylolpropane, pentaerythritol and dipentaerythritol.

Examples of the diisocyanate include aliphatic diisocyanate, alicyclic diisocyanate and aromatic diisocyanate. Specifically, preferable examples thereof include monomers or multimers of hexamethylene diisocyanate, isophorone diisocyanate and toluene diisocyanate.

Examples of the hydroxyl group containing (meth)acrylate include hydroxyaryl (meth)acrylate, hydroxyalkyl (meth)acrylate and hydroxycycloalkyl (meth)acrylate, with hydroxyalkyl (meth)acrylate being preferable. Specific preferable examples thereof include 2-hydroxyethyl (meth)acrylate, 3-hydroxypropenyl (meth)acrylate, 4-hydroxybutyl (meth)acrylate, pentaerythritol triacrylate and dipentaerythritol pentaacrylate.

Examples of the isocyanate group containing (meth)acrylate include 2-isocyanatoethyl methacrylate, 2-isocyanatoethyl acrylate, 1,1-(bisacryloyloxymethyl) ethyl isocyanate and 2-(2-isocyanatoethyloxy) ethyl methacrylate.

In order to reduce warpage and waviness of the cured layer, the number of (meth)acryl groups in one molecule in monomer A is preferably 1 to 6, more preferably 1 to 2.

Specific examples of monomer A include, but not limited to, the following compounds. Monomer A may be used by one kind singly or by mixture of a plurality.

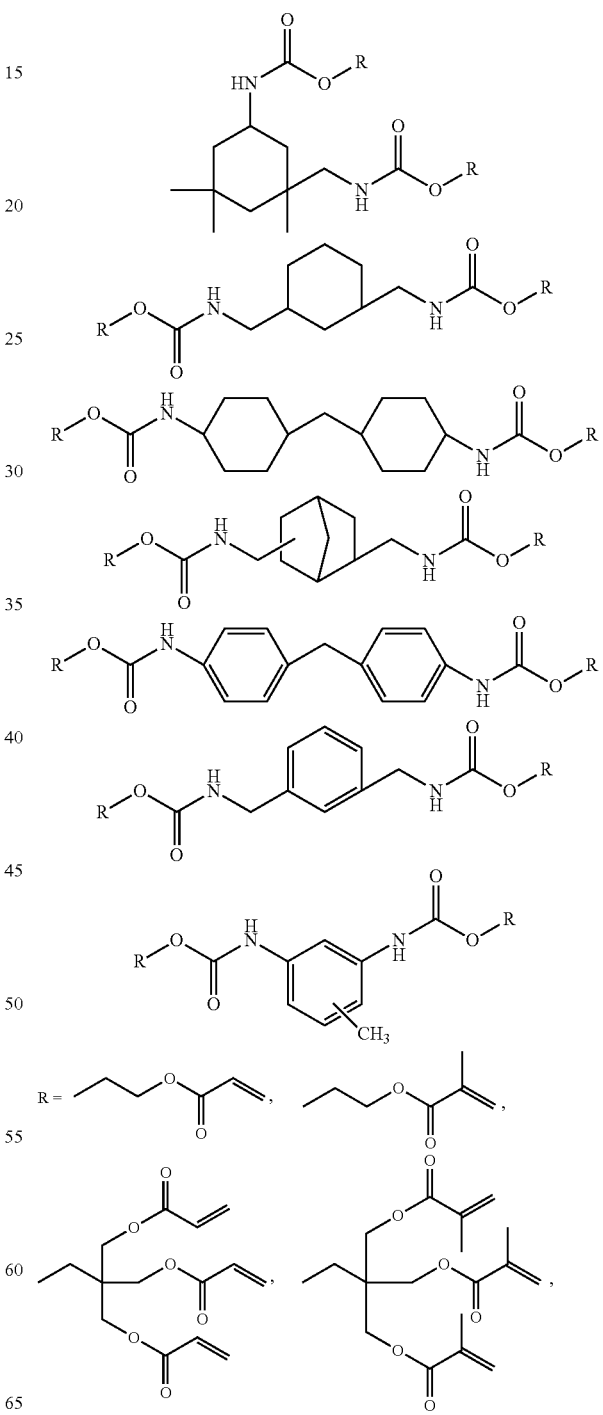

The polymerizable compound preferably contains a (meth)acrylate monomer B different than monomer A (also referred to herein as "monomer B").

In order to reduce warpage and waviness of an obtained cured layer, monomer B preferably has at least one ring structure. The ring structure is preferably the same alicyclic structure, heterocyclic structure, aromatic structure and heteroaromatic structure as those of monomer A.

From the viewpoint of transmittance, monomer B is preferably a (meth)acrylate having the alicyclic structure or a (meth)acrylate having the heterocyclic structure. The inclusion of the (meth)acrylate having the alicyclic structure or the (meth)acrylate having the heterocyclic structure tends to improve light resistance of an obtained cured layer. In addition, from the viewpoint of heat resistance, the alicyclic structure, in particular, preferably has a bridged structure.

In order to reduce warpage and waviness of the cured layer, the number of (meth)acryl groups in one molecule in monomer B is preferably 1 to 6, more preferably 1 to 2.

Monomer B may be used by one kind singly or by mixture of a plurality.

A commercially available compound can be used as monomer B. Alternatively, monomer B can be synthesized by an ordinary method. Examples of the commercially available compounds include: LIGHTESTER series and EPDXYESTER series manufactured by KYOEISHA CHEMICAL CO., LTD.; KAYARAD® series manufactured by Nippon Kayaku Co., Ltd.; NK ester series manufactured by SHIN-NAKAMURA CHEMICAL Co., Ltd.; FANCRYL series manufactured by Hitachi Chemical Co., Ltd.; ARONIX® series manufactured by TOAGOSEI Co., Ltd.; SHIKOH series manufactured by Nippon Synthetic Chemical Industry Co., Ltd.; Art-Resin series manufactured by Negami Chemical Industrial Co., Ltd.; New Frontier series manufactured by DKS Co., Ltd.; BLEMMER® series manufactured by NOF Corporation; OGSOL series manufactured by Osaka Gas Chemicals Co., Ltd.; and the like. When synthesizing, for example, monomer B can be obtained by reacting a corresponding alcohol derivative and a halide (meth)acrylate.

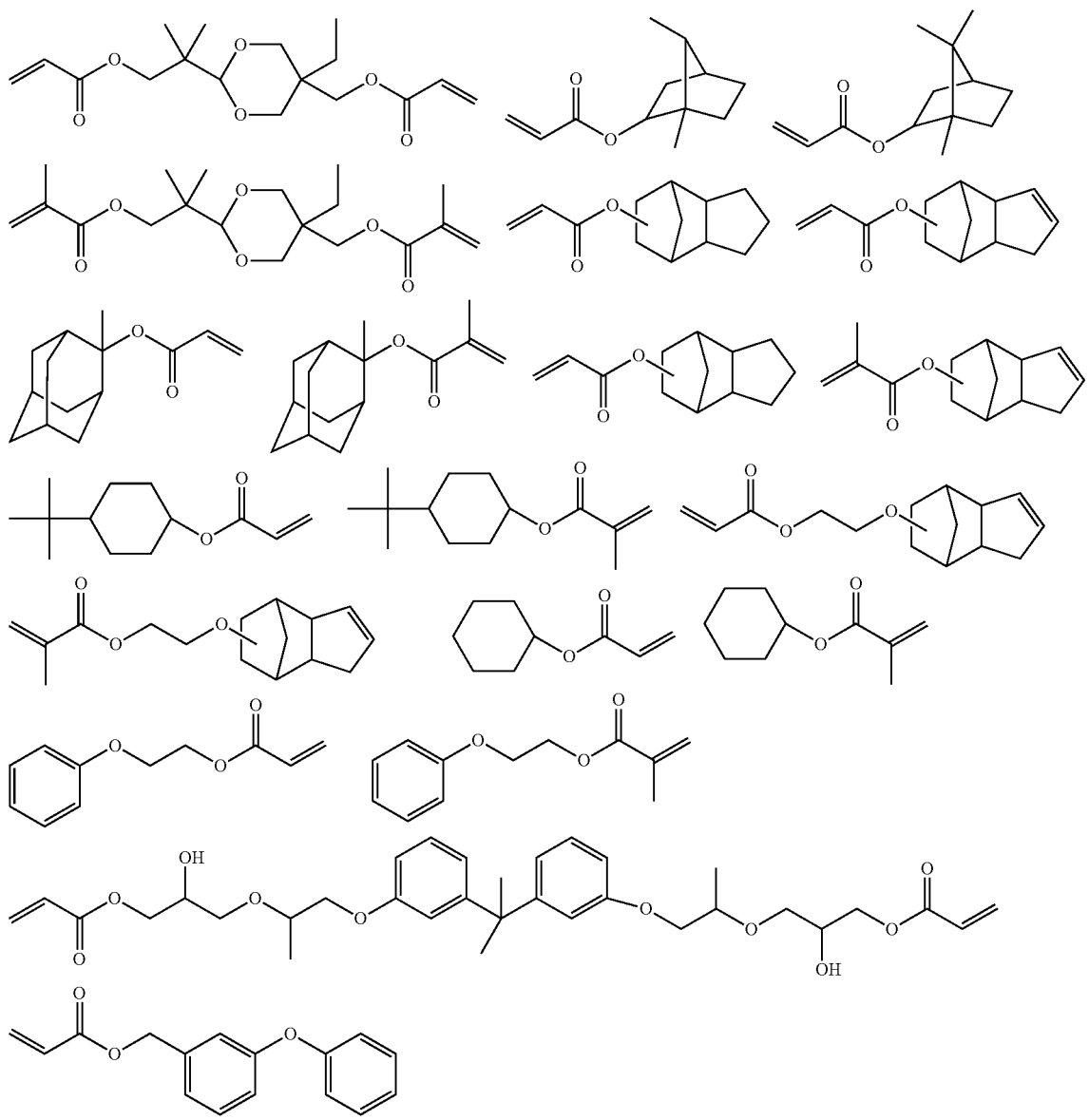

-continued
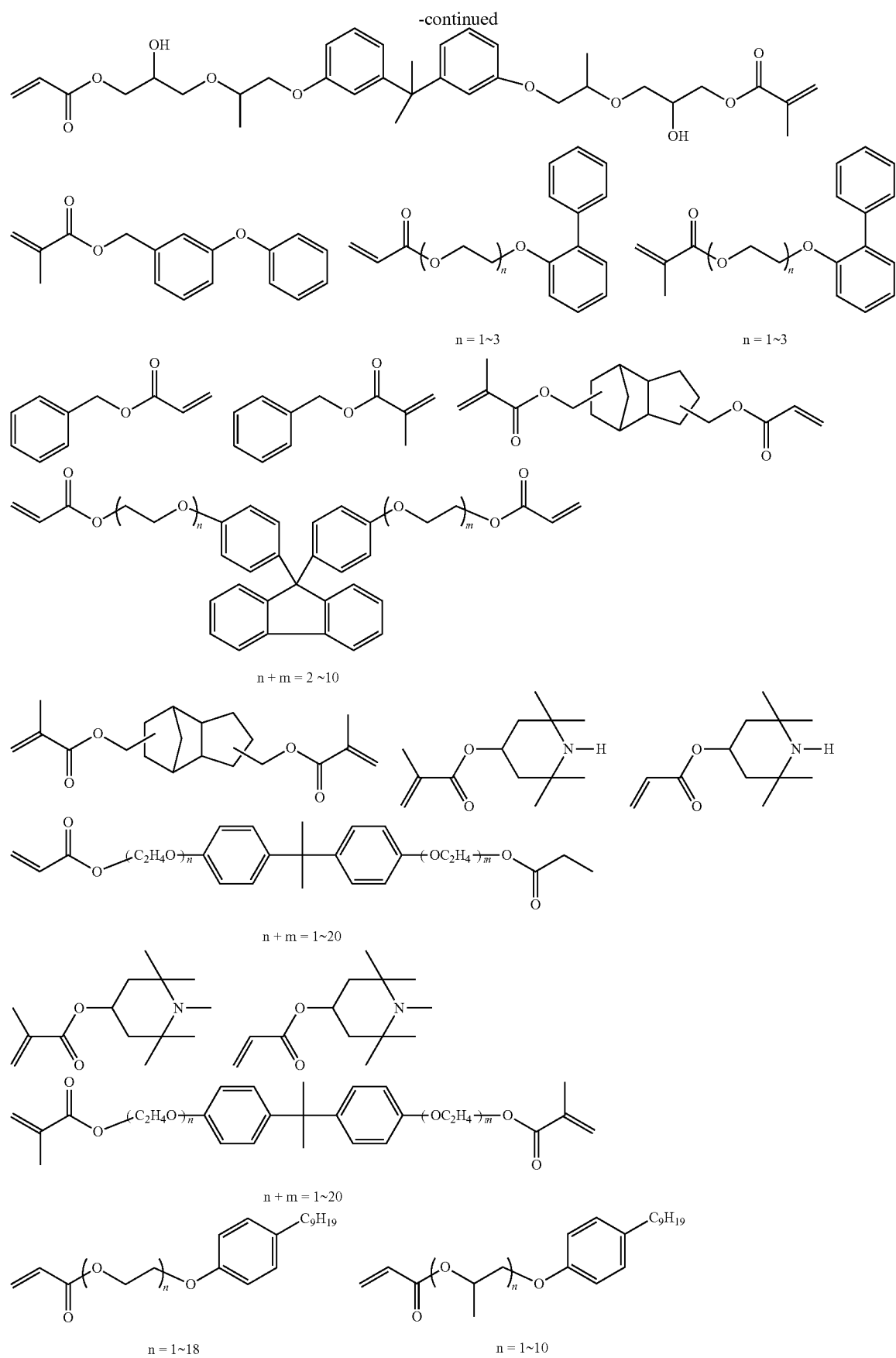

-continued
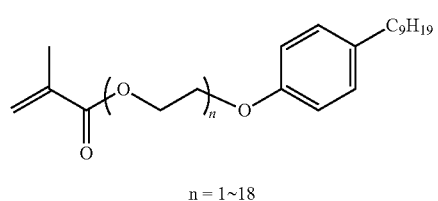
n = 1~18
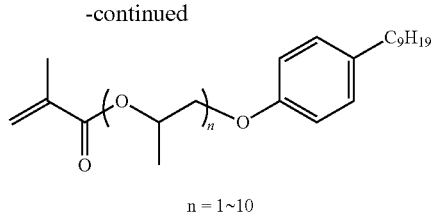
n = 1~10
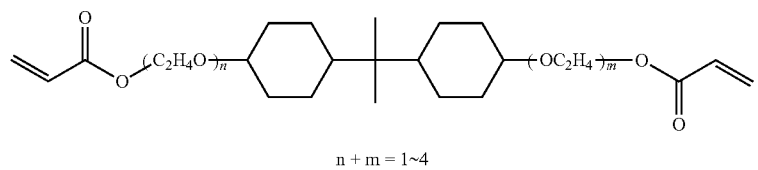
n + m = 1~4
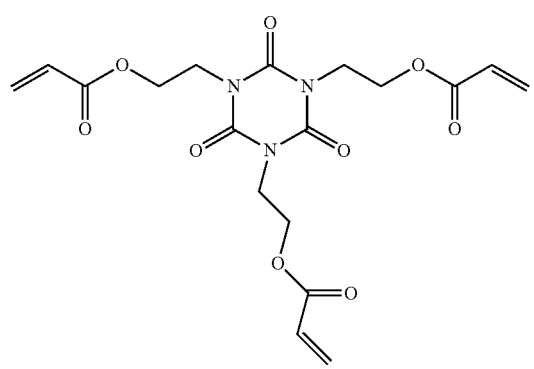
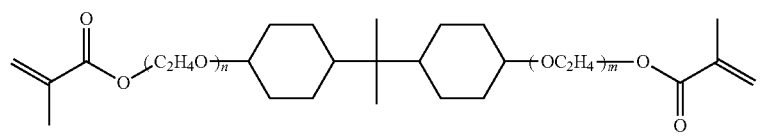
n + m = 1~4
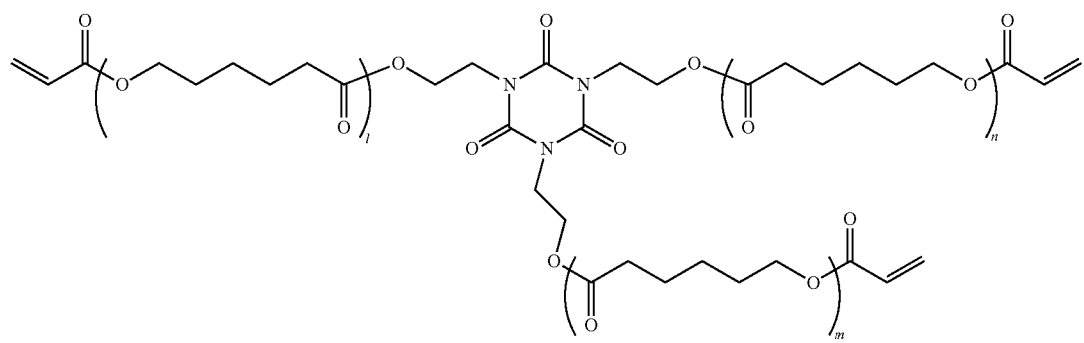
l + n + m = 1~3
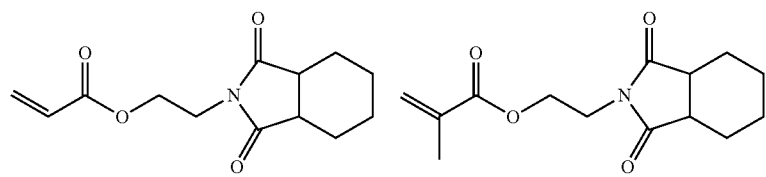
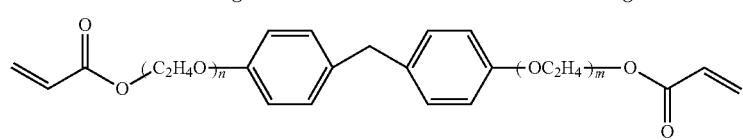
n + m = 2~4

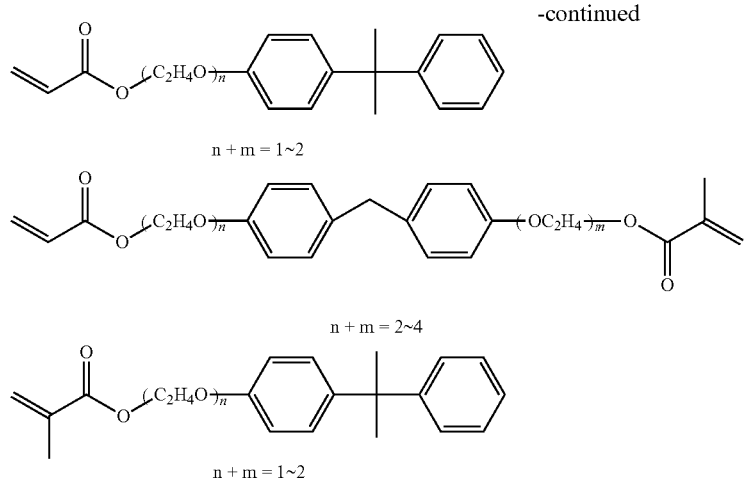

In order to reduce warpage and waviness of an obtained cured layer, the compounding ratio between monomer A and monomer B is preferably monomer A: monomer B=100:0 to 1:99 at mass ratio, more preferably 95:5 to 5:95, far more preferably 80:20 to 20:80.

The polymerizable compound preferably contains a monomer having a methacryloyl group in at least either of monomer A and monomer B. That is to say, the inclusion of urethane methacrylate as monomer A of the polymerizable compound and/or the inclusion of methacrylate as monomer B bring a tendency to restrain heat of polymerization from being generated in curing.

Monomer A and monomer B may contain a monomer having an acryloyl group and a monomer having a methacryloyl group.

Examples of the above-mentioned polymerizable compound include the following combinations.

(1) an aspect such that monomer A contains a urethane methacrylate and a urethane acrylate;
(2) an aspect such that monomer A contains a urethane methacrylate and monomer B contains an acrylate;
(3) an aspect such that monomer A contains a urethane acrylate and monomer B contains methacrylate.

The compounding ratio between the monomer having an acryloyl group and the monomer having a methacryloyl group is preferably 99:1 to 0:100 at mass ratio, more preferably 95:5 to 5:95, far more preferably 80:20 to 20:80.

The polymerizable compound may further contain a monomer C having a polymerizable group except a (meth) acryloyl group. Examples of the polymerizable group of monomer C include an epoxy group, an oxetanyl group, a vinyl group and a vinyl ether group. Monomer C may be contained by 0.1% to 80% by mass in the whole polymerizable compound.

Examples of the monomer having the epoxy group include: CELLOXIDE® 2021P, 2081, and 2000 manufactured by DAICEL CORPORATION; EPIOL ES-F, EPIOL B-4, EPIOL EH-N, EPIOL A, EPIOL P, EPIOL SB, EPIOL TB, EPIOL OH, EPIOL D-100, EPIOL E-100LC, EPIOL E-400, EPIOL E-1000 manufactured by NOF CORPORATION; ADEKA® GLYCEROL ED series such as ED-502, ED-509, ED-509S, ED-529, ED-503, ED-503G, ED-506, ED-523T and ED-505 manufactured by ADEKA CORPORATION; and the like.

Examples of the monomer having the oxetanyl group include 3-ethyl-3-hydroxymethyloxetane, 2-ethylhexyloxetane, xylylenebisoxetane, 3-ethyl-3{[(3-ethyloxetane-3-yl) methoxy]methyl}oxetane, and the like.

Examples of the monomer having the vinyl group include: N-vinyl compounds such as stylene, p-tert-buthoxy styrene, N-vinyl-2-pyrrolidone, N-vinyl acetoamide, N-vinylcaprolactam, and the like; (meth)acrylamide compounds such as dimethyl (meth)acrylamide, diethyl (meth)acrylamide, hydroxyethyl (meth)acrylamide, N,N-dimethyl (meth)acrylamide, (meth)acryloyl morpholine, and the like; and the like.

Examples of the monomer having the vinylether group include: ONB-DVE, OXT-DVE, 4CH-DVE, 4CH-DVE, OXT-DVE, ONB-DVE, and the like, manufactured by DAICEL CORPORATION.

In order to restrain heat of polymerization from being excessively generated in curing, monomers A to C preferably contain a monomer with a molecular weight of 400 or more. Also, from the viewpoint of solubility, the molecular weight is preferably 100,000 or less. With regard to these monomers, the number of (meth)acryloyl groups or other polymerizable groups is preferably small with respect to the molecular weight. That is to say, the numerical value of {(molecular weight)/(the number of polymerizable groups in molecular)} is preferably large. Thus, a tendency to restrain heat of polymerization from being excessively generated in curing is brought. Therefore, a monomer with higher molecular weight has an advantage.

It is preferable that at least one of monomers A-C has the cyclic structure.

Photo Initiator

The photo initiator preferably contains 0.0001 to 1 parts by mass in the composition with respect to 100 parts by mass of the polymerizable compound. The content of the photo initiator is preferably 0.001 or more parts by mass, more preferably 0.005 or more parts by mass, and far more preferably 0.01 or more parts by mass relative to 100 parts by mass of the polymerizable compound. The content of the photo initiator is preferably 0.5 or less parts by mass, more preferably 0.2 or less parts by mass, and far more preferably 0.09 or less parts by mass relative to 100 parts by mass of the polymerizable compound.

The compounding amount of the photo initiator in the range restrains heat of polymerization from being excessively generated in curing, and brings a tendency to improve transmittance of an obtained cured layer. Also, the compounding amount allows change in the transmittance before and after heating the cured layer to be restrained.

The photo initiator is preferably an α-hydroxyalkylphenone photo initiator and an acylphosphine oxide photo initiator. Examples of the α-hydroxyalkylphenone photo initiator include: IRGACURE®184, IRGACURE®1173, IRGACURE®127 and IRGACURE®2959 manufactured by BASF; and ESACURE® ONE, ESACURE® KIP150, ESACURE® KIP75LT, ESACURE® KIP IT and ESACURE® KIP100F manufactured by Lamberti. Examples of the acylphosphine oxide photo initiator include IRGACURE®819, IRGACURE® TPO and IRGACURE® 1800 manufactured by BASF. The photo initiator may be used singly or by mixture of a plurality of kinds.

Other Components

The composition may contain other components except the polymerizable compound and the photo initiator as required.

Examples of the other components include a release agent, a silane coupling agent, an ultraviolet absorbing agent, an antioxidant, a light stabilizer, a plasticizer, an adhesion promoter, a thermal initiator, a coloring agent, a particulate, a photoacid generator, a photobase generator, a surface-active agent, an antifoaming agent, a dispersing agent and a solvent. The components used ordinarily for an optical element are usable for these.

A thermal initiator may be contained but may not be positively contained in the case where curing by the photo initiator serves well.

The antioxidant is preferably a hindered phenol compound and a hindered amine compound. The hindered phenol compound and hindered amine compound having a polymerizable group are particularly preferable for restraining elution and bleedout of antioxidant from a cured material. The polymerizable group of the antioxidant is not particularly limited if it can be polymerized with the polymerizable monomer, but is preferably a radical polymerizable group such as a (meth)acryloyloxy group, a vinyl group, an allyl group and a styryl group.

Specific examples of the antioxidant include IRGANOX®1010, IRGANOX®1035, IRGANOX®1076, IRGANOX®1098, IRGANOX®1135, IRGANOX®1330, IRGANOX®1520, IRGANOX®1726, IRGANOX®3790, IRGANOX®245, IRGANOX®259, IRGANOX®3114, IRGANOX®5057, IRGANOX®565, IRGANOX® PS800, IRGANOX® PS802, CHIMASSORB®2020, CHIMASSORB®944, CHIMASSORB®119, UVINUL®5050, UVINUL®4050, TINUVIN®123, TINUVIN®144, TINUVIN® 152, TINUVIN®292, TINUVIN®622, TINUVIN® PA144, TINUVIN®765, TINUVIN®770, TINUVIN®4050, TINUVIN®111, TINUVIN®622, TINUVIN®783, TINUVIN®791, TINUVIN® XT850, TINUVIN® XT855 and SANOL™ LS-2626 manufactured by BASF; AO-20, AO-30, AO-40, AO-50, AO-60, AO-80, AO-330, PEP-4C, PEP-8, PEP-36, HP-10, 2112, 1178, 1500, C, 135A, 3010, TPP, AO-412S, AO-503, LA-52, LA57, LA-63P, LA-68, LA-72, LA-77Y, LA-81, LA-82 and LA-87 of ADK STAB™ series manufactured by ADEKA CORPORATION; and SUMILIZER® GM(F), SUMILIZER® GS(F), SUMILIZER® GP, SUMILIZER® GA-80, SUMILIZER® MDP-S, SUMILIZER® WX-R, SUMILIZER® WX-RC and SUMILIZER® TP-D manufactured by Sumitomo Chemical Co., Ltd.

The compounding amount of the antioxidant is preferably 0.005 to 15 parts by mass with respect to 100 parts by mass of the whole polymerizable compound, more preferably 0.01 to 10 parts by mass, far more preferably 0.05 to 5 parts by mass.

Preparation of Composition

The composition in some aspects of this disclosure can be prepared by compounding and mixing the polymerizable compound, the photo initiator and other components as required.

Producing Method for Optical Element

A producing method for an optical element according to an aspect of this disclosure is a producing method for an optical element having a cured layer having a concavo-convex structure, the method including:
  forming a composition layer on a base material by using the composition;
  forming a pattern formative layer by pressure-contacting a mold having the concavo-convex structure on a surface of the composition layer and transferring the concavo-convex structure to the composition layer; and
  forming the cured layer having the concavo-convex structure by photo-curing the pattern formative layer, wherein
  a film thickness of the cured layer having the concavo-convex structure is 0.5 mm to 1 cm. Considering a generation of heat of polymerization, a thickness of the cured layer is preferably 8 mm or thinner, and more preferably 5 mm or thinner.

The use of the composition restrains heat of polymerization from being excessively generated in curing, resulting in excellent in heat resistance and transmittance in the obtained cured layer of the optical element.

The mold may be separated after forming the pattern and before photo-curing, or separated after photo-curing. Also, the base material may be part of the optical element, or the cured layer itself may be used as the optical element by removing the base material.

In the case where photo-curing is performed while at least one of the base material and the mold is in contact in order to photoirradiate through at least one of the base material and the mold, a light transparent material is used on the side to be photoirradiated for at least one of the base material and the mold.

In the case where the optical element includes the cured layer and the base material, the base material is preferably a transparent base material with optical transmission. Examples of the transparent base material include a transparent plastic film, a transparent plastic plate and a glass plate. Examples of the plastic include polyester, polycycloolefin, polyolefin, polyvinyl chloride, polyvinyl alcohol, polymethyl (meth)acrylate, triacetyl cellulose, polyimide and polycarbonate.

The steps used for the method of producing the optical element can be performed in the same manner as ordinary steps.

Incidentally, the pattern of the optical element in some aspects of this disclosure signifies pattern transference with a size of several nanometers to several millimeters, and can be applied to pattern transference in nanometer size, micrometer size and millimeter size. The producing method for the optical element of some aspects of this disclosure has a particular effect on minute pattern transference in nanometer size and micrometer size.

Incidentally, "light" in this disclosure includes not merely light and electromagnetic waves with wavelengths in a range such as ultraviolet, near-ultraviolet, far-ultraviolet, visible and infrared, but also radial rays.

The optical element can be produced by the producing method of some aspects of this disclosure while restraining heat of polymerization from being excessively generated in curing. The heat of polymerization generated in curing is influenced by film thickness and the compounding of the composition, and the heat of polymerization is preferably low.

The optical element obtained by the producing method of some aspects of this disclosure has the cured layer with high transmittance. In an aspect of this disclosure, for example, transmittance in a wavelength of 400 nm is preferably 75% or more, more preferably 80% or more.

Also, the optical element obtained by the producing method of some aspects of this disclosure has the cured layer with less change in transmittance before and after heating. For example, a decrease in transmittance of the cured layer after heating at 125° C. for 1 hour is preferably 5% or less.

The optical element produced by the method can be used for uses such as a camera lens such as a condensing lens, a backlight plate, an antireflection film, a film for an optical waveguide, and eyeglasses.

Incidentally, the polymerizable compound is properly selected in accordance with uses of the optical element. For example, in the case of the use for a condensing lens, it is preferable that the cured layer has high refraction index. Therefore, it is preferable that the polymerizable compound has an alicyclic structure or an aromatic structure.

Examples

Some aspects of this disclosure are hereinafter described on the basis of examples, and an aspect of this disclosure is not limited to these examples.

Preparation of Composition

Composition samples 1 to 16 are prepared by compounding each component as shown in Table 1. Monomers A to F, photo initiator and light stabilizer shown in Table 1 are specifically described below. The following monomer C is a mixture.

Synthesis of Monomer A 4.73 g of isophorone diisocyanate, 5.27 g of 2-hydroxyethyl acrylate, 0.0025 g of dibutyltin dilaurate as a catalyst, and 0.005 g of dibutyl hydroxy toluene as a polymerization inhibitor were added into a sample bottle with a screw cap with a volume of 20 mL. After mixing it with a magnetic stirrer, the mixture was reacted at 70° C. for 4 hours, resulting in monomer A.

Synthesis of Monomer C 4.75 g of trimethyl hexamethylene diisocyanate (isomer mixture of 2,2,4-form and 2,4,4-form), 5.25 g of 2-hydroxyethyl acrylate, 0.0025 g of dibutyltin dilaurate as a catalyst, and 0.005 g of dibutyl hydroxy toluene as a polymerization inhibitor were added into a sample bottle with a screw cap with a volume of 20 mL. After mixing it with a magnetic stirrer, the mixture was reacted at 70° C. for 4 hours, resulting in monomer C.

Synthesis of Monomer E 4.44 g of isophorone diisocyanate, 5.56 g of 2-hydroxyethyl methacrylate, 0.0025 g of dibutyltin dilaurate as a catalyst, and 0.005 g of dibutyl hydroxy toluene as a polymerization inhibitor were added into a sample bottle with a screw cap with a volume of 20 mL. After mixing it with a magnetic stirrer, the mixture was reacted at 70° C. for 4 hours, resulting in monomer E.

Acrylate Monomer

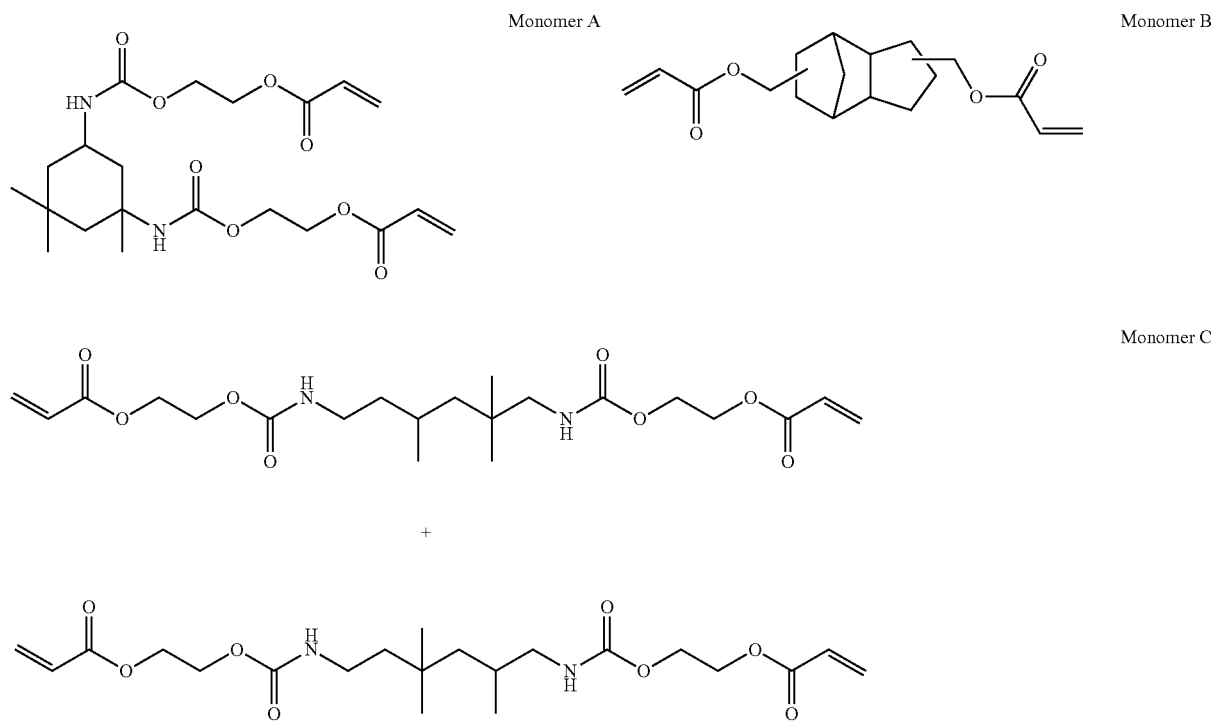

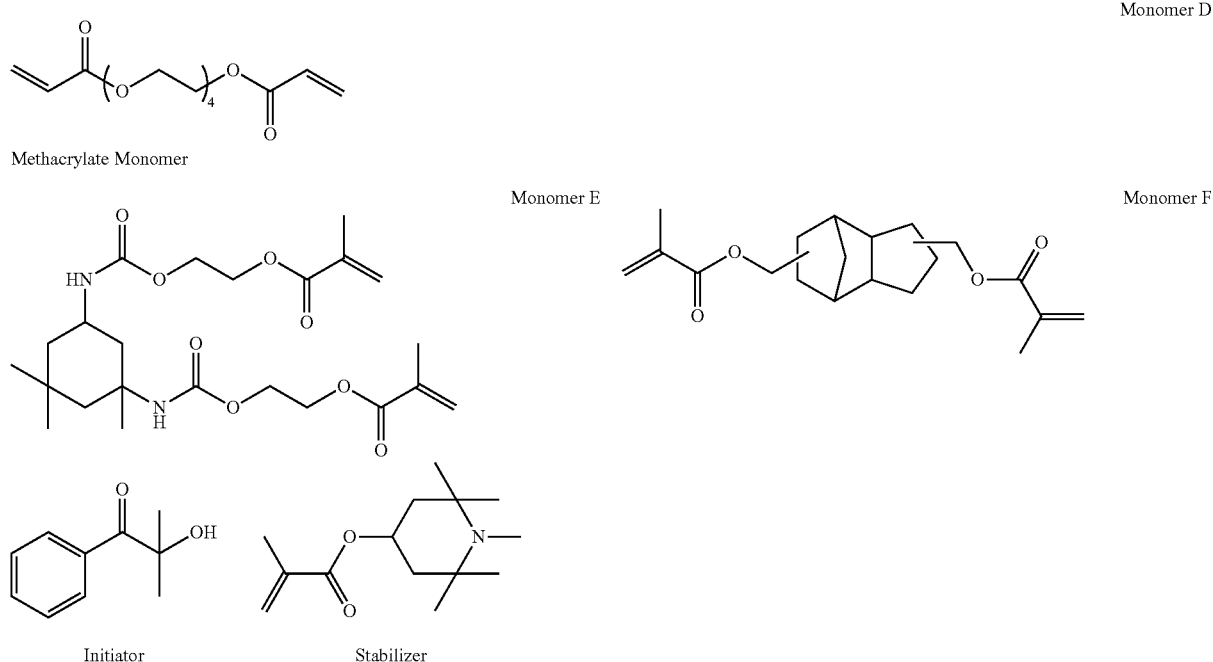

Methacrylate Monomer

Monomer D

Monomer E

Monomer F

Initiator

Stabilizer

Evaluations of Composition Samples

The measurement of transmittance of the cured layer, the measurement of heat of polymerization in curing, the evaluations of warpage and waviness of the cured layer, and the evaluations of curability are performed for each of the obtained composition samples 1 to 16 in the following manner.

Measurement of Transmittance of Cured Film at 400 nm

A set of spacers with a thickness of 3.3 mm was placed on both ends of a glass plate (Product name: EAGLE XG®, Thickness: 1.1 mm, manufactured by Corning Corporation). Each composition sample was dropped on the glass plate and then another glass plate was put so that another glass plate could contact the composition sample.

By performing irradiation with illumination intensity of 20 mW/cm$^2$ for 400 seconds using UV-LED @365 nm through a diffusion plate (Product name: Quarts frost plate, Grit range: #600, Thickness: 1.5 mm, manufactured by Suzuki Optical Co., Ltd.), cured layers 1-16 with a thickness of about 3 mm were obtained.

Each of the resulting cured layers was heat-treated for 1 hour by a warm-air dryer (product name: FORCED CONVECTION OVEN FV-320, manufactured by ADVANTEC) at 125° C. The transmittance under 400 nm of the cured layers before and after heat-treating was measured by an ultraviolet-visible spectrophotometer (product name: V-550, manufactured by JASCO CORPORATION).

Measurement of Heat of Polymerization in Curing (Thickness of 3 mm)

A formwork made of silicon rubber with an outer periphery of 5 cm×5 cm, an inner periphery of 3 cm×3 cm, and a thickness of 3 mm was stuck on a glass plate (product name: EAGLE XG®, thickness: 0.7 mm, manufactured by Corning Corporation), and each of the composition samples was poured into this formwork, covered with another glass plate (product name: EAGLE XG®, thickness: 1.1 mm, manufactured by Corning Corporation), and photoirradiated.

The photoirradiation was performed at a wavelength of 365 nm and an illuminance of 20 mW/cm$^2$ for 400 seconds by using Hg—Xe light source (product name: LIGHTNINGCURE®, LC5 (UV spot light source provided with mercury xenon lamp L8251), manufactured by Hamamatsu Photonics K.K.) through a diffusion plate (Product name: Quarts frost plate, Grit range: #600, Thickness: 1.5 mm, manufactured by Suzuki Optical Co., Ltd.). The maximum temperature measured by using a radiation thermometer (product name: IT-540N, manufactured by Horiba, Ltd.) through the glass plate with a thickness of 0.7 mm was calculated as heat of polymerization in curing.

Measurement of Heat of Polymerization in Curing (Thickness of 1 mm)

In the same manner except for modifying the formwork made of silicon rubber from a thickness of 3 mm to a thickness of 1 mm in the measurement of heat of polymerization in curing (thickness of 3 mm), photo-curing was performed to measure heat of polymerization.

Evaluations of Warpage and Waviness

A set of spacers with a thickness of 1.1 mm was placed on both ends of a glass plate (Product name: EAGLE XG®, Thickness: 1.1 mm, manufactured by Corning Corporation). Each composition sample was dropped on the glass plate and then another glass plate was put so that another glass plate could contact the composition sample. By performing irradiation with illumination intensity of 20 mW/cm$^2$ for 400 seconds using UV-LED @365 nm through a diffusion plate (Product name: Quarts frost plate, Grit range: #600, Thickness: 1.5 mm, manufactured by Suzuki Optical Co., Ltd.), cured layers 1-16 with a thickness of about 1 mm were obtained.

The resulting cured layers were peeled off the glass to visually observe the presence or absence of warpage and waviness. An index of warpage and waviness (Annotation *1 in Table 1) is as follows.

Excellent: no warpage and waviness by visual observation
Very good: very few warpage and waviness by visual observation
Good: a little warpage and waviness by visual observation
Bad: large warpage and waviness by visual observation Evaluations of Curability A set of spacers with a thickness of 0.5 mm was placed on both ends of a glass plate (Product name: EAGLE XG®, Thickness: 1.1 mm, manufactured by Corning Corporation). Each composition sample was dropped on the glass plate and then another glass plate was put so that another glass plate could contact the composition sample. By performing irradiation with illumination intensity of 20 mW/cm$^2$ for 400 seconds using UV-LED @365 nm through a diffusion plate (Product name: Quarts frost plate, Grit range: #600, Thickness: 1.5 mm, manufactured by Suzuki Optical Co., Ltd.), cured layers 1-16 with thickness of about 0.5 mm were obtained. The presence or absence of tackiness on the surface was observed for the cured layers peeled off the glass to confirm curability. Tackiness on the surface as an index of curability (Annotation *2 in Table 1) is as follows.

Non-tackiness: No sense of tacking
Not cured: A composition sample was not cured and remained in the state of liquid.

TABLE 1

| | | Molecular weight | Composition Sample 1 | Composition Sample 2 | Composition Sample 3 | Composition Sample 4 |
|---|---|---|---|---|---|---|
| Acrylate Monomer | Monomer A | 440.4 | 36 | 36 | 36 | |
| | Monomer B | 304.3 | 60 | 60 | 60 | 96 |
| | Monomer C | 442.5 | | | | |
| | Monomer D | 302.3 | | | | |
| Methacrylate Monomer | Monomer E | 468.5 | | | | |
| | Monomer F | 332.4 | | | | |
| | Initiator | | 1 | 0.1 | 0.05 | 0.1 |
| | Stabilizer | | 1 | 1 | 1 | 1 |
| Optical Transmittance at 400 nm | before heating | | 59% | 79% | 83% | 81% |
| | after heating | | 81% | 86% | 87% | 87% |
| Polymerization Temperature during Curing (degrees Celsius) Thickness: 3 mm | | | 144 | 134 | 133 | 148 |
| Polymerization Temperature during Curing (degrees Celsius) Thickness: 1 mm | | | 92 | 77 | 74 | 81 |
| Warpage and waviness*1 | | | Excellent | Excellent | Excellent | Good |
| Curability*2 | | | Non-tackiness | Non-tackiness | Non-tackiness | Non-tackiness |

| | | Molecular weight | Composition Sample 5 | Composition Sample 6 | Composition Sample 7 | Composition Sample 8 |
|---|---|---|---|---|---|---|
| Acrylate Monomer | Monomer A | 440.4 | | | | |
| | Monomer B | 304.3 | 96 | 96 | | |
| | Monomer C | 442.5 | | | 96 | 36 |
| | Monomer D | 302.3 | | | | 60 |
| Methacrylate Monomer | Monomer E | 468.5 | | | | |
| | Monomer F | 332.4 | | | | |
| | Initiator | | 0.01 | 0.001 | 0.1 | 0.1 |
| | Stabilizer | | 1 | 1 | 1 | 1 |
| Optical Transmittance at 400 nm | before heating | | 86% | Not cured | 84% | 81% |
| | after heating | | 86% | Not cured | 82% | 85% |
| Polymerization Temperature during Curing (degrees Celsius) Thickness: 3 mm | | | 102 | Not cured | 133 | 153 |
| Polymerization Temperature during Curing (degrees Celsius) Thickness: 1 mm | | | 59 | Not cured | 84 | 106 |
| Warpage and waviness*1 | | | Good | Not cured | Very good | Very good |
| Curability*2 | | | Non-tackiness | Not cured | Non-tackiness | Non-tackiness |

| | | Molecular weight | Composition Sample 9 | Composition Sample 10 | Composition Sample 11 | Composition Sample 12 |
|---|---|---|---|---|---|---|
| Acrylate Monomer | Monomer A | 440.4 | | 36 | 36 | 36 |
| | Monomer B | 304.3 | | | | |
| | Monomer C | 442.5 | | | | |
| | Monomer D | 302.3 | 96 | | | |
| Methacrylate Monomer | Monomer E | 468.5 | | | | |
| | Monomer F | 332.4 | | 60 | 60 | 60 |
| | Initiator | | 0.1 | 1 | 0.2 | 0.1 |
| | Stabilizer | | 1 | 1 | 1 | 1 |
| Optical Transmittance at 400 nm | before heating | | —*3 | 72% | 81% | 84% |
| | after heating | | —*3 | 62% | 79% | 82% |
| Polymerization Temperature during Curing (degrees Celsius) Thickness: 3 mm | | | 168 | 94 | 86 | 84 |
| Polymerization Temperature during Curing (degrees Celsius) Thickness: 1 mm | | | 115 | 50 | 48 | 46 |

TABLE 1-continued

| | | | Bad Non-tackiness | Excellent Non-tackiness | Excellent Non-tackiness | Excellent Non-tackiness |
|---|---|---|---|---|---|---|
| Warpage and waviness*1 Curability*2 | | | | | | |
| | | Molecular weight | Composition Sample 13 | Composition Sample 14 | Composition Sample 15 | Composition Sample 16 |
| Acrylate Monomer | Monomer A | 440.4 | 36 | | | |
| | Monomer B | 304.3 | | 60 | | |
| | Monomer C | 442.5 | | | | |
| | Monomer D | 302.3 | | | | |
| Methacrylate Monomer | Monomer E | 468.5 | | 36 | 36 | 36 |
| | Monomer F | 332.4 | 60 | | 60 | 60 |
| | Initiator | | 0.05 | 0.1 | 1 | 0.1 |
| | Stabilizer | | 1 | 1 | 1 | 1 |
| Optical Transmittance at 400 nm | before heating | | 86% | 81% | 77% | 84% |
| | after heating | | 86% | 86% | 53% | 84% |
| Polymerization Temperature during Curing (degrees Celsius) Thickness: 3 mm | | | 76 | 116 | 76 | 65 |
| Polymerization Temperature during Curing (degrees Celsius) Thickness: 1 mm | | | 43 | 62 | 49 | 42 |
| Warpage and waviness*1 Curability*2 | | | Excellent Non-tackiness | Excellent Non-tackiness | Excellent Non-tackiness | Excellent Non-tackiness |

Annotation *3 in Table 1 means that optical transmittance could not be evaluated because a cured layer was cracked during photo curing.

As shown in Table 1, the composition sample containing more photo initiator compared to polymerizable compound tends to have low transmittance before heating, and change in transmittance between and after heating thereof tends to be large.

On the other hand, in the case where the photo initiator is excessively less compared to the polymerizable compound, a tendency is exhibited to obtain sufficient curing with difficulty. Samples other than the composition sample 6 do not have tackiness in both cured layers with thickness of 1 mm and 3 mm, which were obtained in Evaluation of Heat of Polymerization.

The composition sample containing more photo initiator compared to polymerizable compound and/or not containing urethane (meth)acrylate in the polymerizable compound, exhibits a tendency toward high heat of polymerization.

On the other hand, it was found that the composition sample including the methacryloyloxy group containing monomer in the polymerizable compound tends to restrain heat of polymerization from being excessively generated.

The composition sample containing urethane (meth)acrylate in the polymerizable compound tends to have good warpage and waviness properties. The use of a polymerizable monomer having a cyclic structure exhibits a tendency toward improvement in warpage and waviness properties.

Throughout the above examples, it was found that by using a specific composition related to some aspects of this disclosure, a rise in heat of polymerization can be suppressed and a cured layer with an excellent transmittance can be obtained. Therefore, some aspects of this disclosure can provide a method of producing an optical element, which can efficiently form a cured layer with a thick film by a photo imprinting method.

Some aspects of this disclosure can provide a method of producing an optical element having a cured layer that is excellent in restraining a rise in heat of polymerization and transmittance.

What is claimed is:

1. A method for producing an optical element having a cured layer having a concavo-convex structure, the method comprising:
    forming a composition layer on a base material by utilizing a composition containing a polymerizable compound and a photo initiator;
    forming a pattern formative layer by pressure-contacting a mold having the concavo-convex structure on a surface of the composition layer and then transferring the concavo-convex structure to the composition layer; and
    forming the cured layer having the concavo-convex structure by photo-curing the pattern formative layer,
    wherein the polymerizable compound contains both:
        (a) a urethane (meth)acrylate monomer having a molecular weight of 400 or more; and
        (b) a (meth)acrylate monomer having at least one of an alicyclic structure or a heteroalicyclic structure, the (meth)acrylate monomer (b) being other than the urethane (meth)acrylate monomer (a),
    wherein the polymerizable compound has a composition ratio, by mass, of (a) to (b),
        wherein the mass of the urethane (meth)acrylate monomer (a) is from less than 100 parts by mass to 36 parts by mass based on 100 parts by mass of the polymerizable compound, and
        wherein the mass of the (meth)acrylate monomer (b) is from greater than 0 parts by mass to 60 parts by mass based on 100 parts by mass of the polymerizable compound, respectively,
    wherein the composition contains 0.005 to 0.5 part by mass of the photo initiator based on 100 parts by mass of the polymerizable compound, and
    wherein a film thickness of the cured layer having the concavo-convex structure is within the range of 0.5 mm to 1 cm.

2. The method according to claim 1, wherein at least one of (a) the urethane (meth)acrylate monomer and (b) the (meth)acrylate monomer contains a monomer having a methacryloyl group.

3. The method according to claim 1, wherein the polymerizable compound contains a monomer having a polymerizable group, except for a (meth)acryloyl group.

4. The method according to claim 1, wherein the polymerizable compound further contains a monomer (c) having a ring structure.

5. The method according to claim 4, wherein at least one of monomers (b) and (c) contains a monomer with a molecular weight greater than or equal to 400.

6. The method according to claim 1, wherein the urethane (meth)acrylate monomer (a) has a ring structure.

7. A method for producing an optical element having a cured layer having a concavo-convex structure, the method comprising:
utilizing a composition comprising:
100 parts by mass of a polymerizable compound comprising both:
(a) a urethane (meth)acrylate monomer having a molecular weight of 400 or more, and
(b) a (meth)acrylate monomer having at least one of an alicyclic structure or a heteroalicyclic structure, the (meth)acrylate monomer having a ring structure being other than the urethane (meth)acrylate monomer,
a composition ratio, by mass, of (a) to (b),
wherein the mass of the urethane (meth)acrylate monomer (a) is from less than 100 parts by mass to 36 parts by mass based on the 100 parts by mass of polymerizable compound, and
wherein the mass of the (meth)acrylate monomer (b) is from greater than 0 parts by mass to 60 parts by mass based on the 100 parts by mass of polymerizable compound, respectively, and
from 0.005 to 0.5 parts by mass of a photo initiator to form a composition layer on a base material;
pressure-contacting a mold having the concavo-convex structure on a surface of the composition layer and then transferring the concavo-convex structure to the composition layer to form a pattern formative layer; and
photo-curing the pattern formative layer to form the cured layer having a film thickness of from 0.5 mm to one (1) cm.

8. The method according to claim 7, wherein at least one of the urethane (meth)acrylate monomer and the (meth)acrylate monomer contains a monomer having a methacryloyl group.

9. The method according to claim 7, wherein the (meth)acrylate monomer contains a monomer with a molecular weight greater than or equal to 400.

* * * * *